United States Patent

[11] 3,610,906

[72] Inventor William A. Stampler
Hatboro, Pa.
[21] Appl. No. 774,138
[22] Filed Nov. 7, 1968
[45] Patented Oct. 5, 1971
[73] Assignee Burroughs Corporation
Detroit, Mich.

[54] BINARY MULTIPLICATION UTILIZING SQUARING TECHNIQUES
5 Claims, 35 Drawing Figs.

[52] U.S. Cl. .......... 235/164
[51] Int. Cl. .......... G06f 7/52
[50] Field of Search .......... 235/164, 194

[56] References Cited

UNITED STATES PATENTS

| | | | |
|---|---|---|---|
| 3,065,423 | 11/1962 | Peterson | 235/164 X |
| 3,191,017 | 6/1965 | Miura et al. | 235/194 |
| 3,290,493 | 12/1966 | Githens, Jr. et al. | 235/164 |
| 3,393,308 | 7/1968 | Cope | 235/194 X |
| 3,444,360 | 5/1969 | Swan | 235/156 |
| 3,500,026 | 3/1970 | Pokorny | 235/160 |

OTHER REFERENCES

Richards, " Arithmetic Operations in Digital Computers," 1955, pp. 138- 140

Caplener, " High-Speed Parallel Digital Multiplier," Technical Disclosure Bulletin, Vol. 12, No. 5, Oct. 1969, pp. 685

*Primary Examiner*—Malcolm A. Morrison
*Assistant Examiner*—David H. Malzahn
*Attorney*—Carl Fissell, Jr.

ABSTRACT: A means and a method of high-speed multiplication are presented which are capable of replacing existing multiplication methods in present day digital data processing systems. In the system disclosed, the two operands may be manipulated in the computer's arithmetic unit so that the multiplier logic unit need perform only two squaring functions, followed by a subtraction. This latter subtraction function also may be performed by the arithmetic unit of the computer.

There are various ways in which this squaring can replace multiplying two different operands. Generally in the preferred method, operands *a* and *b* are added together and squared. Next the two original operands are subtracted and squared. Finally the second product is subtracted from the first and effectively divided by four to obtain the result. Variations of this method are more specifically described as they are used in this invention.

INVENTOR.
WILLIAM A. STAMPLER
BY
Edward J. Feeney Jr.
ATTORNEY

INVENTOR.
WILLIAM A. STAMPLER
BY
Edward J. Feeney Jr.
ATTORNEY

PATENTED OCT 5 1971 3,610,906

SHEET 03 OF 11

INVENTOR.
WILLIAM A. STAMPLER

BY Edward J. Feeney Jr.
ATTORNEY

*INVENTOR.*
WILLIAM A. STAMPLER

BY Edward J. Feeney Jr.
ATTORNEY

INVENTOR.
WILLIAM A. STAMPLER
BY Edward J. Feeney Jr.
ATTORNEY

INVENTOR.
WILLIAM A. STAMPLER
BY Edward J. Feeney Jr.
ATTORNEY

INVENTOR.
WILLIAM A. STAMPLER

BY Edward J. Feeney Jr.
ATTORNEY

INVENTOR.
WILLIAM A. STAMPLER
BY Edward J. Feeney Jr.
ATTORNEY

INVENTOR.
WILLIAM A. STAMPLER
BY Edward J. Feeney Jr.
ATTORNEY

INVENTOR.
WILLIAM A. STAMPLER

BY Edward J. Feeney Jr.
ATTORNEY

INVENTOR.
WILLIAM A. STAMPLER
BY
Edward J. Feeney Jr.
ATTORNEY

BINARY MULTIPLICATION UTILIZING SQUARING TECHNIQUES

BACKGROUND OF THE INVENTION

1. Field of the Invention

One criterion for evaluating a digital computer is the speed with which it can multiply. For example, a recently known data processing specification called for multiplying two 35-bit words in only 1 microsecond. Although this is extremely fast at present, even faster speeds will be required in the near future. This invention provides a novel system for meeting the need for rapidly multiplying two binary numbers. It is based upon the substantial use of logic made practical by the advent of integrated circuits and other high-speed microcircuitry.

2. Description of the Prior Art

There are several ways in which a digital computer might obtain the product of two numbers. Presently, the most common method is to "multiply" by repeated addition. Other methods could include the use of a table of logarithms stored in memory, or the impractical method of storing all possible products in memory and accessing the desired product through a conventional matrix using the multiplicand and multiplier as inputs.

Another theoretical method of multiplying is by using logic to produce the product directly from the operands (multiplicand and multiplier). As far as is known, this method has not been used in conventional arithmetic units, possibly because of the complexity of the logic circuitry that is required. To illustrate this complexity, consider multiplying two 20-bit words. There are $2^{20}$ or 1,048,576 possible arrangements of the bits in each operand; the total possible number of combinations ($2^{40}$) that would have to be multiplied would be over one trillion ($10^{12}$). A substantial reduction in logic is possible if the two operands are always identical. Thus "squaring" a 20-bit word requires logic for only 1,048,576 input arrangements. The decrease in logic complexity is therefore appreciable.

$$\begin{array}{r} 2^{40}=1{,}099{,}511{,}627{,}776 \\ 2^{20}=\qquad 1{,}048{,}576 \\ \hline \text{difference}=1{,}099{,}510{,}579{,}200 \end{array}$$

Thus the need for supplying logic to handle the 1,099,510,579,200 input possibilities is eliminated (in the above example) by keeping the two 20-bit operands identical.

BRIEF SUMMARY OF THE INVENTION

In the system of multiplying being disclosed, the two operands are manipulated in the computer's arithmetic unit so that the "multiplier" logic unit need only perform two "squaring" functions followed by a subtraction (also performed in the same arithmetic unit). Briefly then, it is evident that the disclosed multiplication system requires one addition, two subtractions and two right shifts (or the equivalent), all of which can be performed by the conventional arithmetic unit of a computer, plus two squaring operations performed by the novel squaring logic unit described herein. These requirements do not increase with increases in operand word length. Further, parallel operation is possible, as one subtraction can be performed in the arithmetic unit while the squaring logic is working on squaring the sum of the operands.

There are various ways in which "squaring" can replace multiplying two different operands. Three ways will now be shown using "$a$" and "$b$" as the value of the operands. Examples of each way substituting six and four for $a$ and $b$, respectively, are shown to the right of each method. The first method A is shown below:

$$\begin{array}{l} (a+b)^2=a^2+2ab+b^2 \\ (a-b)^2=a^2-2ab+b^2 \\ \hline \text{difference}=4ab \\ \text{divide by } 4=ab \end{array} \qquad \text{Proof:} \qquad \begin{array}{r} (6+4)^2=100 \\ (6-4)^2=\ \ 4 \\ \hline \text{difference}=\ 96 \\ \text{divide by } 4=\ 24 \end{array}$$

In this (the preferred method) operands $a$ and $b$ are added together and squared. Then the two original operands are subtracted and squared. Finally the second product is subtracted from the first and effectively divided by four to obtain the result. A variation of this method is described in detail later. Next method B is illustrated.

$$\begin{array}{l} (a+b)^2=a^2+2ab+b^2 \\ a^2+b^2=a^2+b^2 \\ \hline \text{difference}=2ab \\ \text{divide by } 2=ab \end{array} \qquad \text{Proof:} \qquad \begin{array}{r} (6+4)^2=100 \\ 6^2+4^2=\ 52 \\ \hline \text{difference}=\ 48 \\ \text{divide by } 2=\ 24 \end{array}$$

This method is slower than method A because three quantities must be squared to obtain the desired answer. One advantage to this method is that it is not necessary to determine whether operand "$a$" or operand "$b$" is the greater quantity because the one is not subtracted from the other, as in methods A and C. Method C is shown next.

$$\begin{array}{l} a^2+b^2=a^2+b^2 \\ (a-b)^2=a^2-2ab+b^2 \\ \hline \text{difference}=2ab \\ \text{divide by } 2=ab \end{array} \qquad \text{Proof:} \qquad \begin{array}{r} 6^2+4^2=52 \\ (6-4)^2=\ 4 \\ \hline \text{difference}=48 \\ \text{divide by } 2=24 \end{array}$$

This method is also slower than method A and therefore is not as desirable for high-speed operation as the preferred method.

Methods other than those mentioned above may be used to replace multiplying by squaring. However, one of the basic tenets of this inventive concept is that the input operands (multiplicand and multiplier) are manipulated or modified to allow use of logic that is less complicated than if the unmodified input operands were multiplied by logic alone.

DETAILED DESCRIPTION (including the preferred embodiment)

Figure 1:
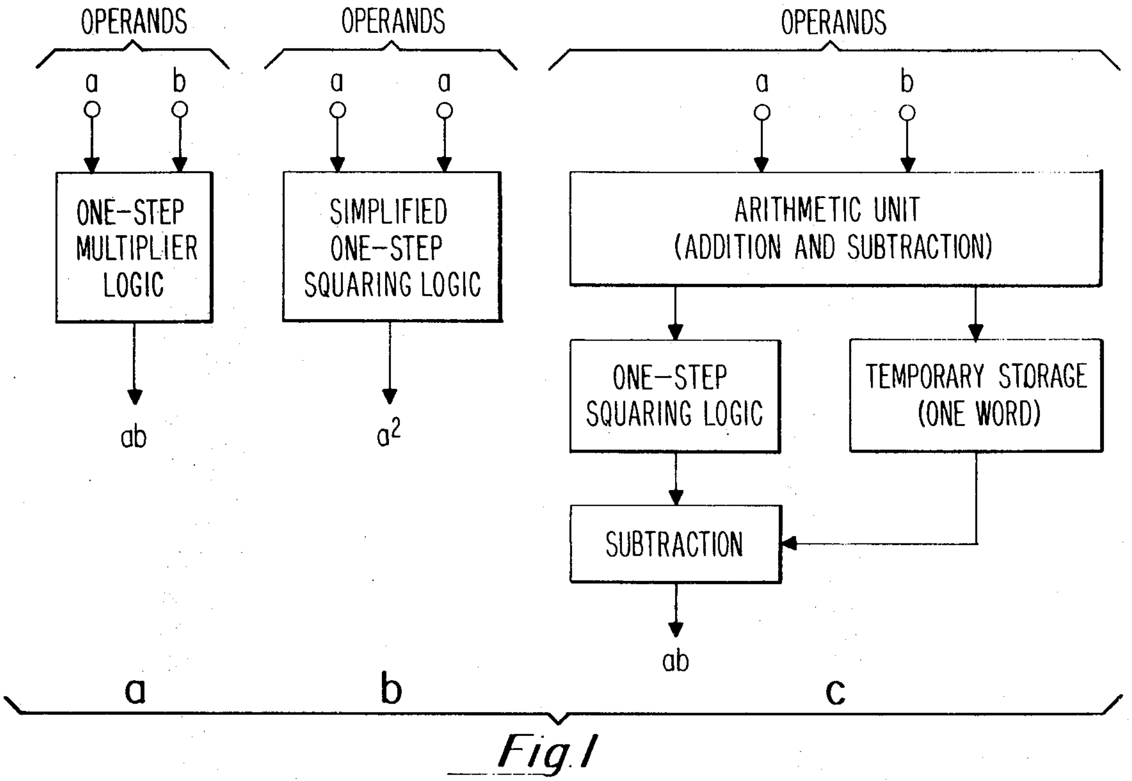
FIG. 1 is an illustration of a plurality of methods of multiplying using logic.

To initiate the description, it is perhaps advisable to first compare the logic necessary for general multiplying with that which is necessary for the more specific multiplication of squaring. FIG. 1 illustrates in simplified block form three methods of multiplying using logic. Thus, there is the direct method of multiplication using a single step of multiplier logic. Next there is the direct squaring method which simply uses a single step of squaring logic. Finally there is the present system of multiplication using squaring logic. In this system, the operands are applied to an arithmetic unit for addition and subtraction prior to their application to the one-step squaring logic and the temporary storage means.

Thus, FIG. 1 illustrates a theoretical method of multiplying using logic to produce the product directly from the operands (multiplicand and multiplier). Possibly because of the complexity of the logic circuitry that is required, this method has received little or no use. For example, consider multiplying two 20-bit words. Since each operand has $2^{20}$ possible combinations, there are 1,048,576 possible arrangements of the bits in the individual operands. The total possible number of combinations that would have to be multiplied would be $2^{40}$ or over one trillion ($10^{12}$).

FIG. 1*b* illustrates the squaring method and in this method a reduction of logic is possible since the two operands are identical. The squaring of a 20-bit word then requires only 1,048,576 input arrangements and the reduction in logic complexity is notable. In FIG. 1*c*, by manipulating the two operands in the computer's arithmetic unit so that the multiplier's logic unit need perform two squaring functions, followed by a subtraction, the advantages of the logical simplicity of squaring are achieved in all cases regardless of the fact that the operands are different.

Comparison of Logic for Multiplying and Squaring

Figure 2:
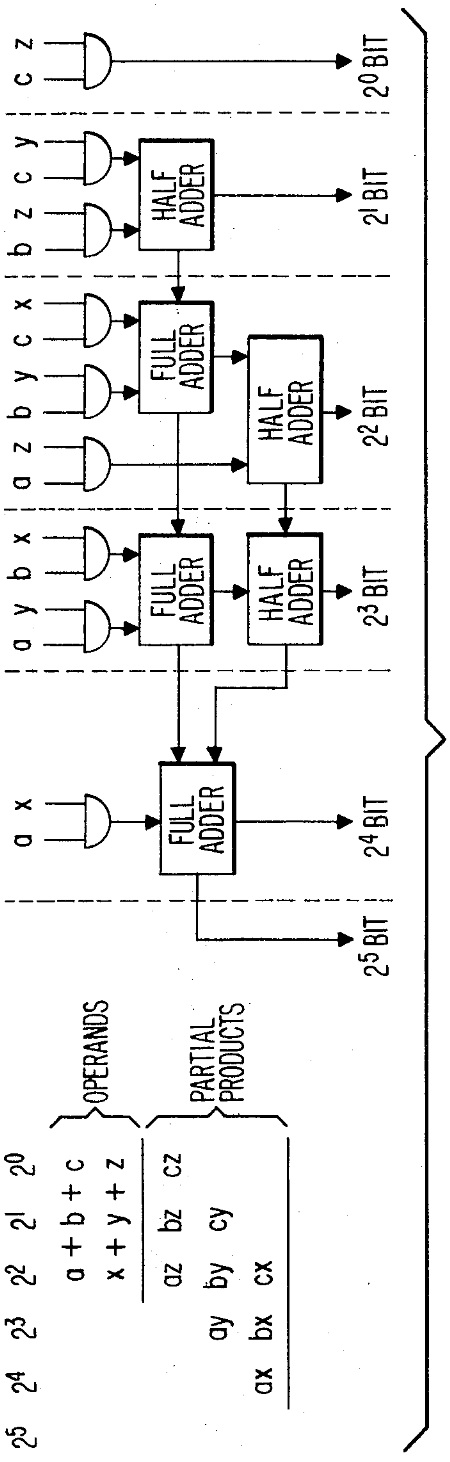
Fig. 2 PRIOR ART
FIG. 2 illustrates a prior art system of multiplying of two 3-bit operands.
Figure 3:
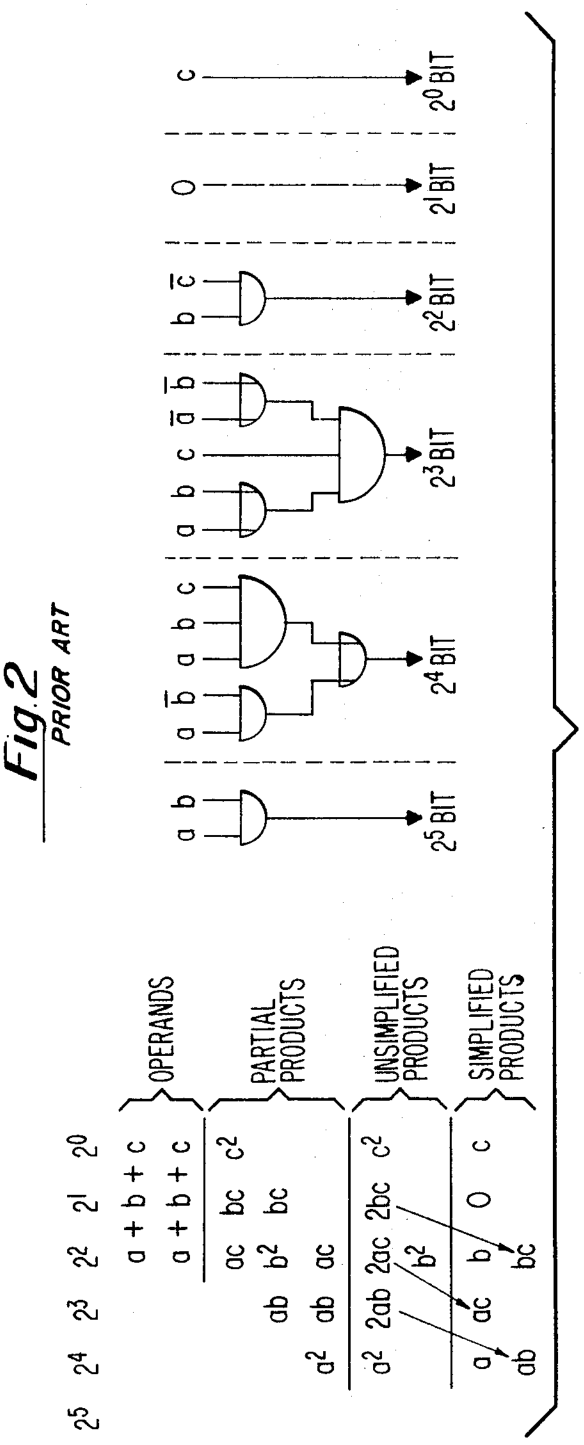
FIG. 3 illustrates the present system of multiplying by the squaring of two 3-bit operands.

To gain an idea of the magnitude of simplification obtained by the disclosed method, two 3-bit words are multiplied as shown in the left portion of FIG. 2; the e logic required to implement the multiplication directly is shown on the right side of FIG. 2. FIG. 3 shows the multiplication of one 3-bit word (*a*, *b* and *c*) by itself (squaring) and the required logic. As shown, the unsimplified product is:

$$(a^2)2^4+aab(2^3)+(2ac+b^2)2^2+(1bc)2^1+(c^2)2^0$$

This expression can be simplified by the following considerations:

Squaring a Binary Digit

In binary arithmetic, any bit $x^n$ is equal to $x$ when $n$ is a positive number not equal to zero. For example, $$0^1=0;\ 0^2=0,\ 0^3=0;\ \text{etc.}$$
$$1^1=1;\ 1^2=1;\ 1^3=1;\ \text{etc.}$$

Therefore in the example of FIG. 3, $$a^2=a,\ b^2=b,\ \text{and}\ c^2=c.$$

Eliminating 2 as a Coefficient

In binary arithmetic, multiplying by 2 is usually accomplished by shifting left by one bit. Therefore:

$$(2ab)2^3=(ab)2^4;\ (2ac)2^2=(ac)2^3;\ (2bc)2^1=(bc)2^2$$

Simplified Product

As indicated in FIG. 3, the above two considerations lead to the following simplified product:

$$(a=ab)2^4+(ac)2^3+(b+bc)2^2+(0)2^1+(c)2^0$$

From the above example, it is apparent that when any binary integer is squared, the $2^1$ bit is always equal to zero, and little or no logic is necessary to produce this portion of the product. It is also apparent, since $c^2=c$ in the example of FIG. 3, that the least significant bit ($2^0$) of the product is always equal to the same bit of the operand. In other words squaring an odd number produces an odd number; squaring an even number produces an even number. Therefore, little or not logic is needed to transfer bit $2^0$ of the operand to bit $2^0$ of the product.

Conclusions of Comparison

With the above simplifications incorporated, the logic needed to square a 3-bit word can be implemented as shown in the right portion of FIG. 3. In this example, the register that is to hold the product is cleared (to ZERO) before the product is transferred to it. FIG. 3 shows that the squaring logic requires only eight simple gates, while the multiplying logic shown in FIG. 2 requires nine simple gates plus three full-adders plus three half-adders. The squaring logic shown, in addition to being much simpler than the multiplying logic, is also much faster; no carry propagation is needed in the example shown. Although it will be shown later that carries are normally necessary in implementing direct squaring logic for larger operands, the method being disclosed is still basically fast, and is simpler than multiplying logic for equivalent operands. (Buffers, standardizers, etc. are omitted from consideration in this description as they perform no logical function other than maintaining or restoring logic levels.)

With the comparative simplicity of squaring versus multiplying thus illustrated, by the preceding 3-bit examples, it will next be described how multiplication is achieved by the "-difference of two squares" approach that was mentioned previously.

The following table A shows visually how the product of two different operands can be obtained by the "difference of two squares" approach.

TABLE A

| OPERANDS (a)×(b) | | CONVENTIONAL PRODUCT | | EQUIVALENT PRODUCT |
|---|---|---|---|---|
| 20×20 | = | 400 | = | 400–0 |
| 21×19 | = | 399 | = | 400–1 |
| 22×18 | = | 396 | = | 400–4 |
| 23×17 | = | 391 | = | 400–9 |
| 24×16 | = | 384 | = | 400–16 |
| 25×15 | = | 375 | = | 400–25 |
| 26×14 | = | 364 | = | 400–36 |
| 27×13 | = | 351 | = | 400–49 |
| 28×12 | = | 336 | = | 400–64 |
| 29×11 | = | 319 | = | 400–81 |
| 30×10 | = | 300 | = | 400–100 |
| 31×9 | = | 279 | = | 400–121 |
| 32×8 | = | 256 | = | 400–144 |
| 33×7 | = | 231 | = | 400–169 |
| 34×6 | = | 204 | = | 400–196 |
| 35×5 | = | 175 | = | 400–225 |
| 36×4 | = | 144 | = | 400–256 |
| 37×3 | = | 111 | = | 400–289 |
| 38×2 | = | 76 | = | 400–324 |
| 39×1 | = | 39 | = | 400–361 |
| 40×0 | = | 0 | = | 400–400 |
| 41×(−1) | = | −41 | = | 400–441 |
| 42×(−2) | = | −84 | = | 400–484 |

In the table shown the left column lists operands whose average value is 20 (for example, (14+26)/2=20). The next column shows the "conventional" product of each set of operands. The last column shows an "equivalent" product (for example 364=400−36). Note that the 400 is the square of the average of the operands, and that the numbers subtracted form 400 are equal to the square of half the difference of the operands; thus $36=[(26-14)/2]^2$. By this method the table shows empirically that the "difference of two squares" approach can actually replace conventional multiplication.

Table A holds true when both operands are either odd or even numbers. When one operand is odd and one is even, the concept functions are as shown in table B.

TABLE B

| OPERANDS (a)×(b) | | CONVENTIONAL PRODUCT | | EQUIVALENT PRODUCT |
|---|---|---|---|---|
| 9.5×9.5 | = | 90.25 | = | 90.25–0 |
| 9×10 | = | 90 | = | 90.25–0.25 |
| 8×11 | = | 88 | = | 90.25–2.25 |
| 7×12 | = | 84 | = | 90.25–6.25 |
| 6×13 | = | 78 | = | 90.25–12.25 |
| 5×14 | = | 70 | = | 90.25–20.25 |
| 4×15 | = | 60 | = | 90.25–30.25 |
| 3×16 | = | 48 | = | 90.25–42.25 |
| 2×17 | = 34 | | = | 90.25–56.25 |
| 1×18 | = | 18 | = | 90.25–72.25 |
| 0×19 | = | 0 | = | 90.25–90.25 |
| –1×20 | = | –20 | = | 90.25–110.25 |
| –2×21 | = | –42 | = | 90.25–132.25 |
| –3×22 | = | –66 | = | 90.25–156.25 |

In the example of 7 ×12=84, the disclosed method obtains the average of seven and 12 (9.5) and squares it (90.25). Then the operands are subtracted (12–7=5), divided by two (5/2 =2.5), and squared $(2.5)^2=6.25$. Finally the 6.25 is subtracted from the 90.25 to provide the desired result of 84.

Example Using Binary Operands

The following illustration shows how a computer utilizing the techniques disclosed herein could multiply six by four. The decimal equivalents of the binary numbers are shown for clarification of the process. Note that dividing by two is accomplished by a right shift.

| | Binary operation | Decimal operation |
|---|---|---|
| Problem: 110×100=? | | Problem: 6×4=? |
| Operands | 110<br>100 | 6<br>4 |
| Sum of operands | 1010 | 10 |
| Dividing by 2 (right shift) | 101 | 5 |
| Squaring | 011001 | 25 |
| Operands | 110<br>100 | 6<br>–4 |
| Difference of operands | 010 | 2 |
| Dividing by 2 (right shift) | 001 | 1 |
| Squaring | 000001 | 1 |
| Differences of two squares | 011001<br>000001 | 25<br>1 |
| Product | 011000 | 24 |

It is seen from the illustration that the right shift may be obtained while the sum (or difference) of the operands is transferred into the input register of the squaring logic. Thus, no time is lost in an actual shifting operation as such.

Algorithms for implementing the above process and variations thereof are described later. Timing considerations and details of the squaring logic are discussed next.

Although many methods of speeding up conventional multiplication are being used at present, such as s grouping 2, 3, 4 or 5 bits of the multiplier together to decrease the number of additions and by use of subtraction techniques etc. the increase in logic is appreciable and partially offsets the advantages of increased speed.

The squaring logic described herein produces the square of a number in one step for high-speed operation. No timing pulses or counters are required. However, the complexity of the squaring logic depends upon the length of the operands.

Figure 4:
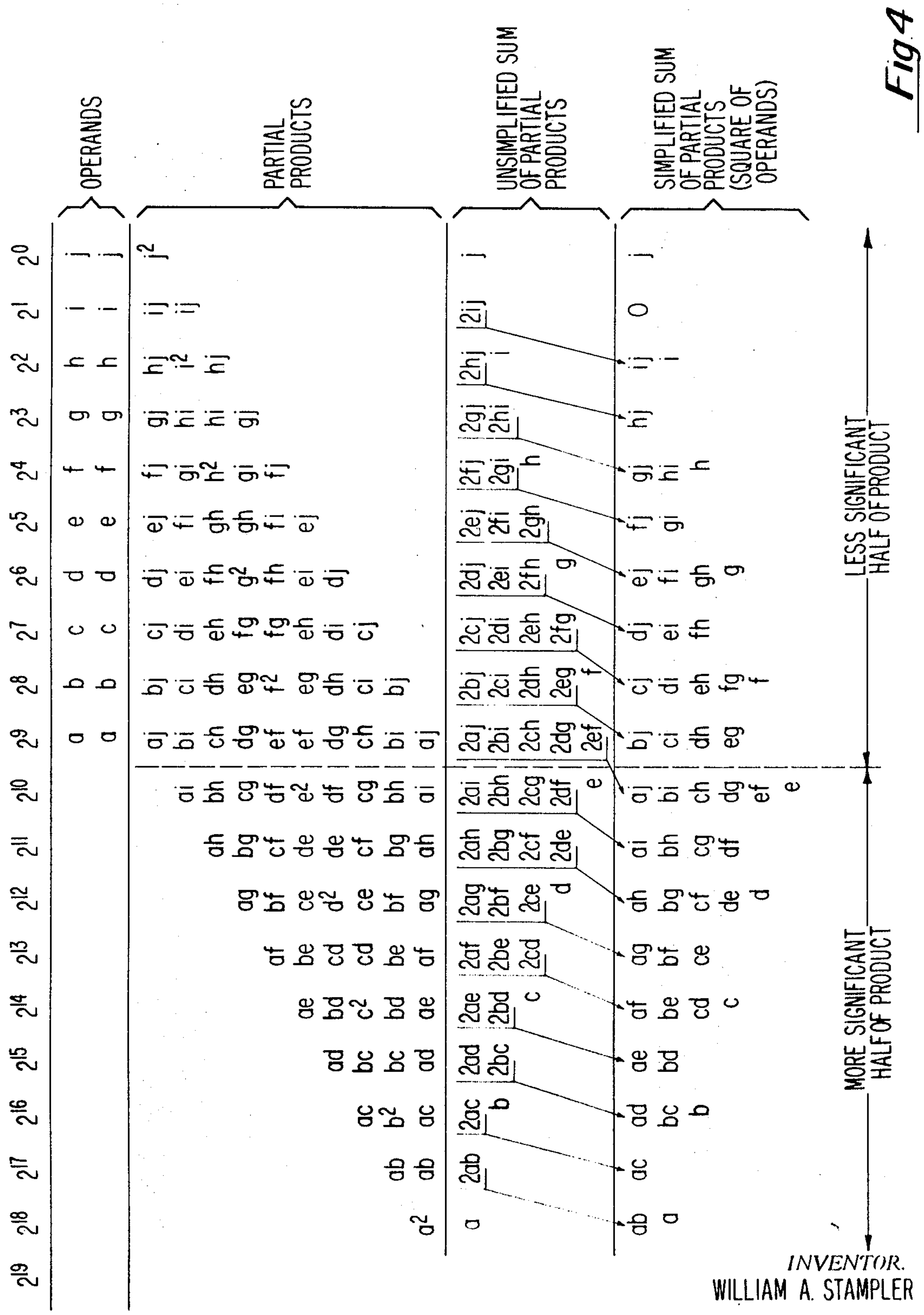
FIG. 4 illustrates a system for the development of 10-bit squaring logic requirements.

A method for developing the logic requirements for a 10-bit operand is shown in FIG. 4. This development utilizes techniques discussed previously in connection with the 3-bit squaring logic. Logic requirements for operands of greater length than 10 bits can be developed by similar methods but are omitted in this description by space considerations.

In FIG. 4, "*j*" is the least significant bit ($2^0$) of the operand and "*a*" is the most significant bit of the operand ($2^9$). The partial products are obtained by multiplying each bit bit of the operand by itself and by each other bit, as in conventional algebra. The logical implementation of each partial product is extremely simple. As explained before, $a^2=a$, $b^2=b$, etc. and requires no logic. Since each pair of dissimilar bits results in adding two similar partial products (for example, $i\times j=ij$; $j\times i=ij$; and $ij+ij=2ij$), the coefficient "2" is eliminated by an effective "left shift" as indicated by the slanting arrows in FIG. 4. This simplification of shifting "on paper" (incorporating the shifting in the design rather than the hardware) eliminates the need for shifting in the squaring logic unit. Note that in the drawings of this application, the product of two dissimilar bits such as "*i*" and "*j*" is shown as *ij*, as in ordinary algebra. The truth table for multiplying *i* and *j* produces a binary 0 output except when both *i* and *j* are binary 1. When this occurs the product is a binary 1.

Therefore the logic required to multiply *i* by *j* is merely a 2-input AND gate, and such a logical device is well known in the art.

Figure 5:
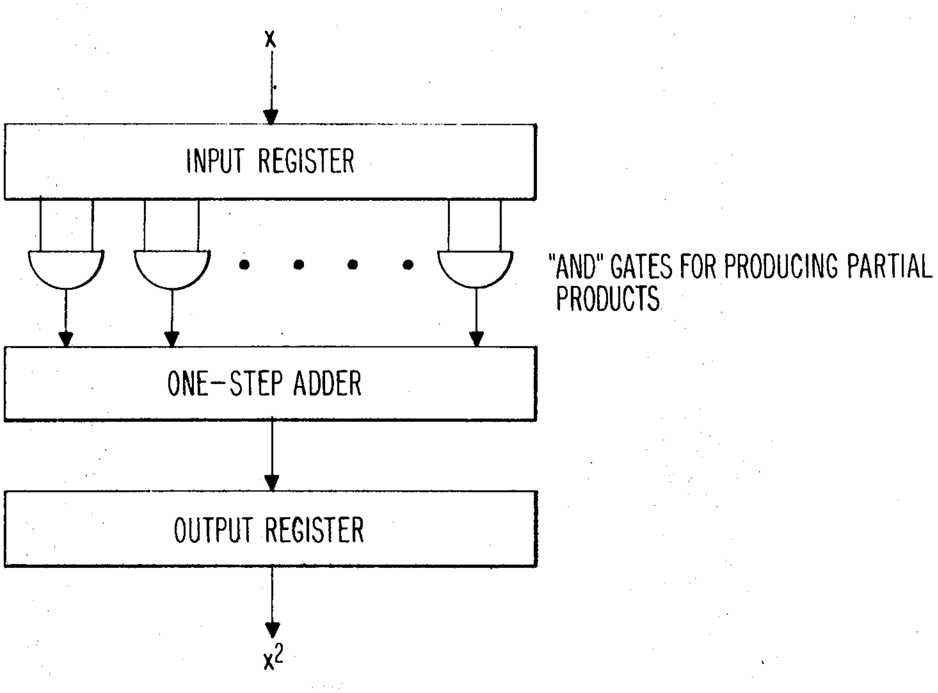
FIG. 5 is a simplified diagram of the squaring logic.

Since the partial products can be obtained by simple AND gates, it is only necessary to provide additional logic to add these partial products to obtain the desired answer (the square of the operand). Of course, the partial products can be added in a conventional arithmetic unit to produce the required answer. However, this would take so much time that it is not considered practical for most applications. Instead, in this invention, the partial products are combined in one logical operation, which can be considered as a one-step addition. It is assumed herein that separate registers hold the operand that is to be squared (input register) and the result of the squaring (output register) as indicated in FIG. 5. In practice, the functions of either or both registers may be performed in registers also used at other times for other purposes.

The one-step adder to be described combines the partial products of the 10-bit operand (or slight variations thereof) to produce the 20-bit full precision answer directly. Thus the entire squaring logic can be considered asynchronous, as timing pulses and counters are generally not necessary. Merely placing an operand in the input register can cause the answer to appear in the output register.

The one-step adder that adds the partial products can be designed to produce each bit of the result directly without using "carries" such as in conventional addition. This is very fast and desirable; however, the logic becomes complicated in most cases. Each bit of the result can also be obtained by using conventional half-adders, full-adders and the associated carries. To gain high speed without excessively increased logical complication, a combination of both methods is used in this invention. The one-step adder generates multiple carries virtually simultaneously, to gain high speed. As will be shown later, the time required to propagate all the carries to produce the 20-bit result is less than the time required to propagate a single carry bit by bit from the least significant bit to the most significant bit in a conventional 20-bit adder using conventional logic.

In addition to the usual logical gating configurations an exclusive OR gate is required. The exclusive OR gate (XOR) is also a well-known circuit which produces an output signal (logical ONE) only when the inputs differ. That is, when the inputs are A and $\overline{B}$ (not B) the output equals 1 and conversely when $\overline{A}$ (not A) and B are the inputs, the output is 1. Further, those blocks indicated in the drawings HA and FA are half-adders and full-adders respectively and such logic circuits are very well known and require no further description to those skilled in the art to which this multiplier pertains.

Detailed Description of One-Step Squaring Logic for 10-Bit Operand

The logic for squaring a 10-bit operand is illustrated in the various drawings comprising FIG. 6. Both the gating for producing partial products and the one-step adder are shown together in each FIG. 6 drawing. They are shown in separate blocks in FIG. 5 to aid in explaining the operation off the squaring logic.

The logic for each bit of the double-precision 20-bit product is described below. The three least significant bits of the product ($2^0$, $2^1$, $2^2$) are grouped together because of their simplicity.

Figure 6A:
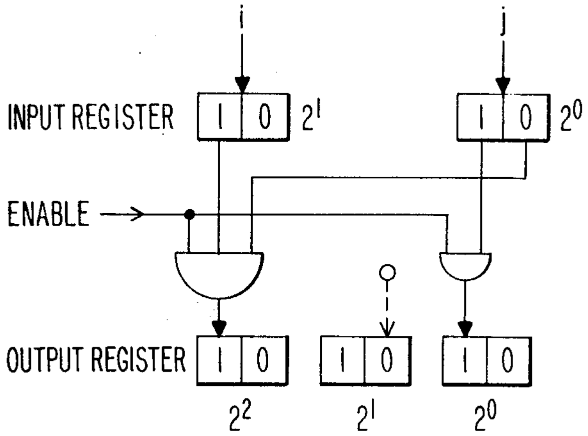
FIG. 6 includes FIGS. 6*a* to 6*u* and illustrates the necessary logic circuits for providing each of the required bits in the squaring of a 10-bit operand. The gating circuits for the production of partial products and the single step adder are shown together in each drawing of FIG. 6.

Bits $2^0$, $2^1$, and $2^2$ (FIG. 6*a*)

The "logic" need only set the $2^0$ bit of the output register to ONE when the same bit of the operand in the input register is ONE. The $2^1$ bit in the 20-bit output register is always ZERO. In the $2^2$ bit logic, the gating is set up to correspond with the requirements shown in FIG. 4, which indicates that adding partial products *ij* and *i* produces the sum for the $2^2$ bit of the output register. Thus, the logic sets the $2^2$ bit in the output register to ONE only when bit *i* of the operand equals ONE, and bit *j* of the operand equals ZERO.

Figure 6B:
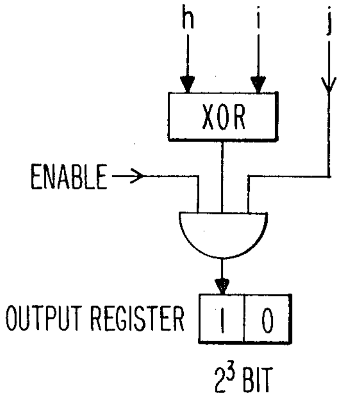
Figure 6C:
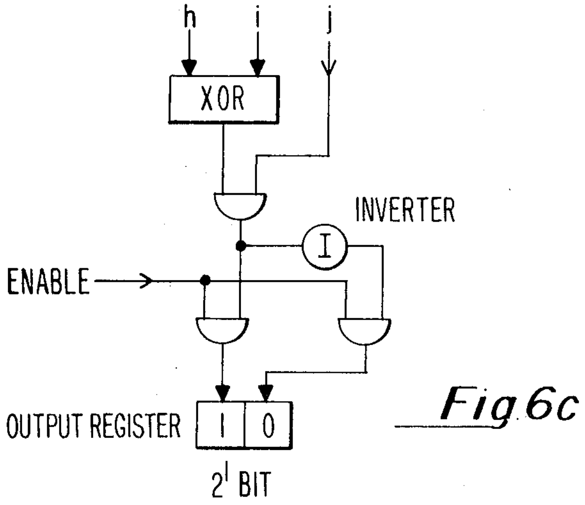

Bit $2^3$ (FIGS. 6*b* and 6*c*)

An exclusive OR gate and a 3-input AND gate produce the sum for the $2^3$ bit of the output register. Note that no carries from previous stages are required so far. Although the squaring logic produces an output without timing pulses, it will probably be necessary to use a conventional "enable" signal (shown in FIGS. 6*a*, 6*b* and 6*c*) to gate the output of the logic unit into the output register, so that transients do not switch a flip-flop that should remain in the ZERO state. This enable signal can be applied after all carries (to be described) are propagated and all transients have subsided sufficiently. An advantage of the enable signal and associated gating is that the squaring logic can use any available register in the computer is its output register. For example, the "input" register shown in FIG. 5 could be used to hold the result of the squaring, if both the ZERO and ONE outputs are supplied by the squaring logic. The logic being described can be modified as shown in FIG. 6*c* or by other methods to provide both ZERO and ONE outputs so that the register being used to accept the output of the squaring logic need not be cleared to ZERO. This option will not be discussed further; to simplify the explanations, it will be assumed that the output of the squaring logic feeds into a previously cleared register through enabling gates that are omitted from the drawings from here on.

Also for the sake of clarity, the flip-flops of the input register will be omitted in the remaining drawings, and only the signal stored by the individual flip-flops will be identified. For example, FIG. 4 shows that the signal "*g*" of the operand is stored in the $2^3$ flip-flop of the input register. Only the signal "*g*" and/or its negation signal "$\bar{g}$" is shown.

Figure 6D:
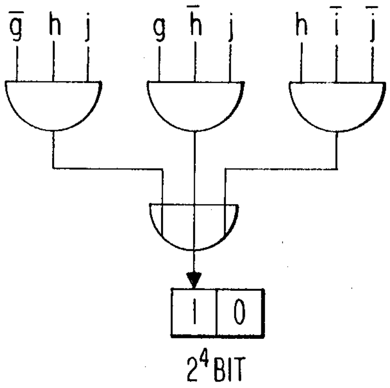
Figure 6E:
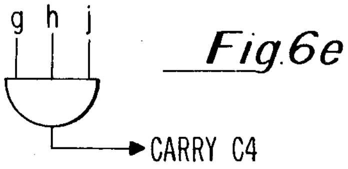

Bit $2^4$ (FIG. 6*d*)

The logic of FIG. 6*d* produces the output to bit $2^4$ of the output register without requiring carries from previous stages. The carries normally produced by full-adders or half-adders for use by the next stage are replaced by the logic shown in FIG. 6*e*, which provides the "carry" input for the $2^5$ logic.

Note that the logic is becoming more complicated and "loading down" of the input register is increasing. If conventional adders and the associated carries are used in the squaring logic, the only significant loading on the input register is caused by the AND gates that normally combine the partial products for use by the one-step adder. As a design option, this system will use more conventional logic with propagation of carries in most of the succeeding stages, to avoid logical complication and excessive loading down of the input register.

Figure 6F:
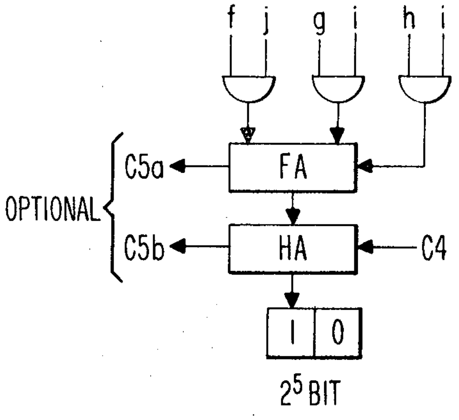
Figure 6G:
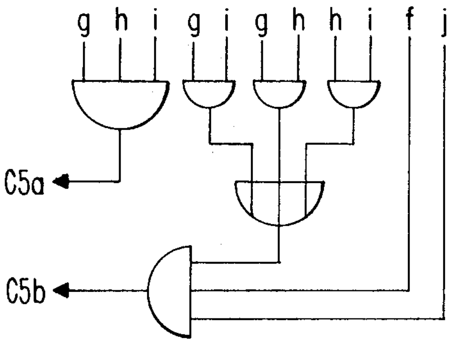

Bit $2^5$ (FIGS. 6*f* and 6*g* )

Two full-adders are used to produce the bit $2^5$ output. Although two carries (C5*a* and C5*b*) are produced by the adders they need not be used. To shorten the "carry chain" and thus speed up the squaring logic, the carries to be used by the bit $2^6$ logic are generated directly as shown in FIG. 6*g*.

Figure 6H:
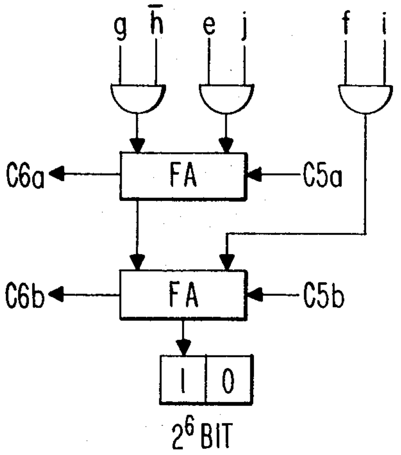
Figure 6I:
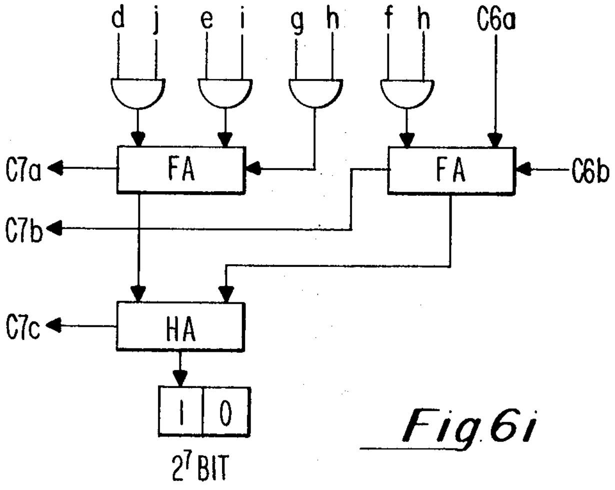
Figure 6J:
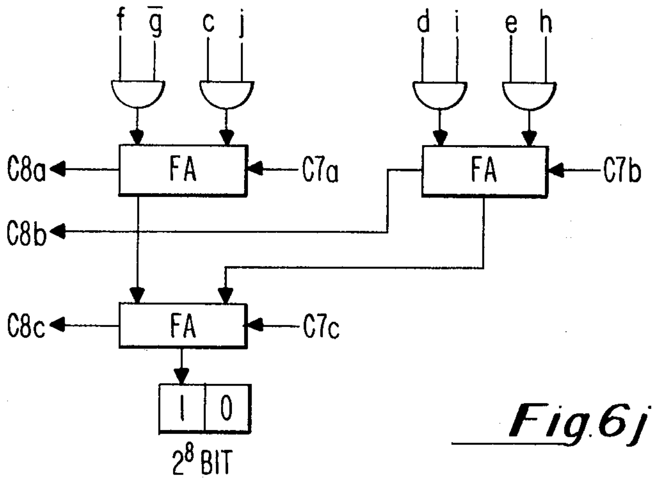
Figure 6K:
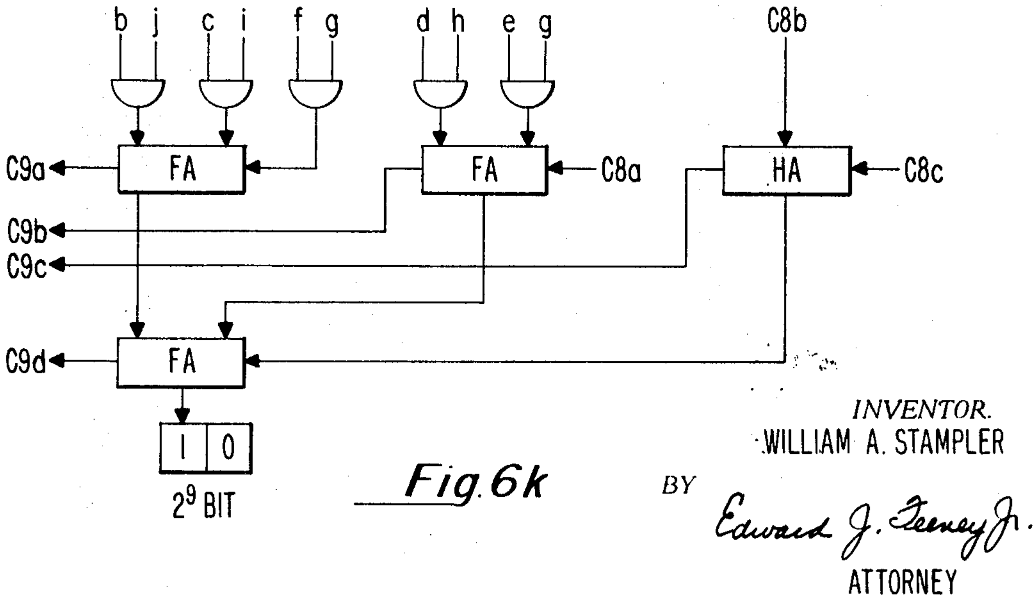
Figure 6L:
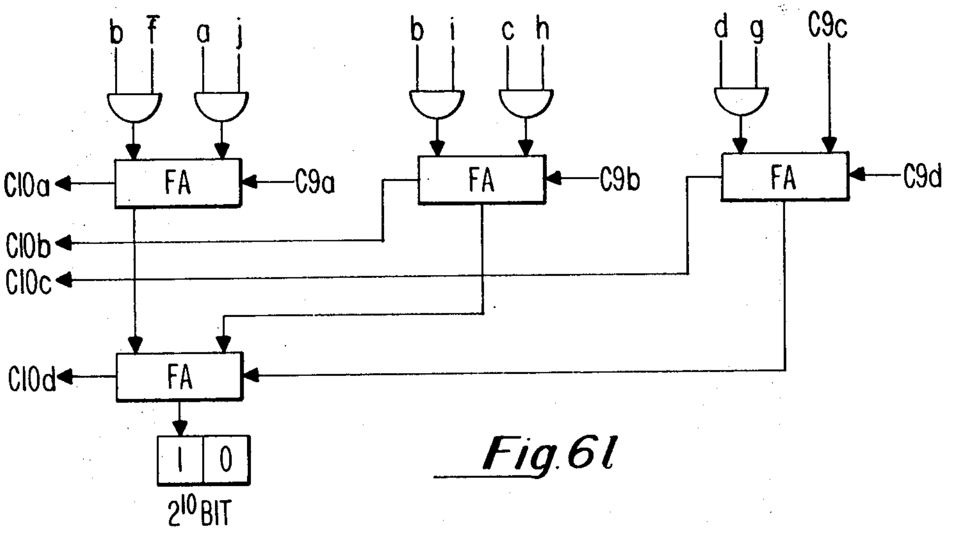
Figure 6M:
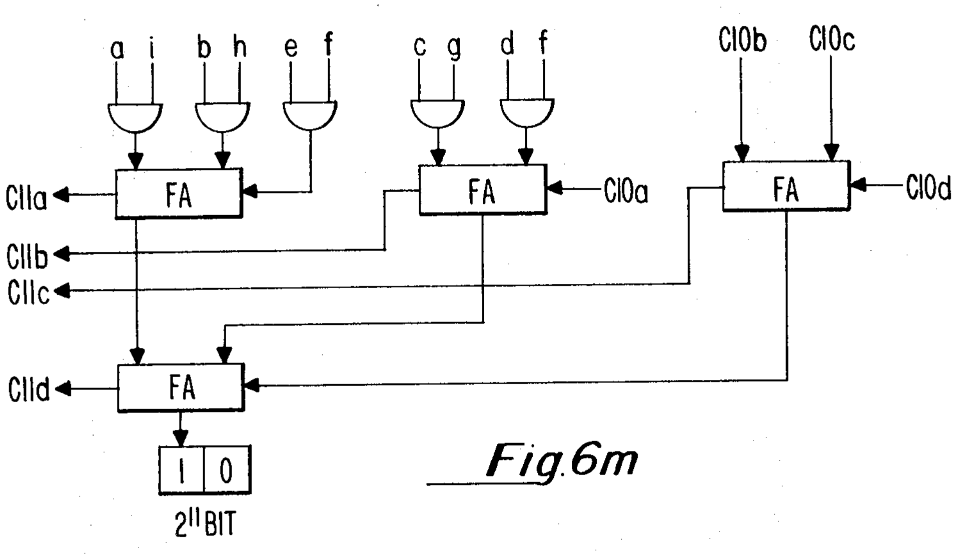
Figure 6N:
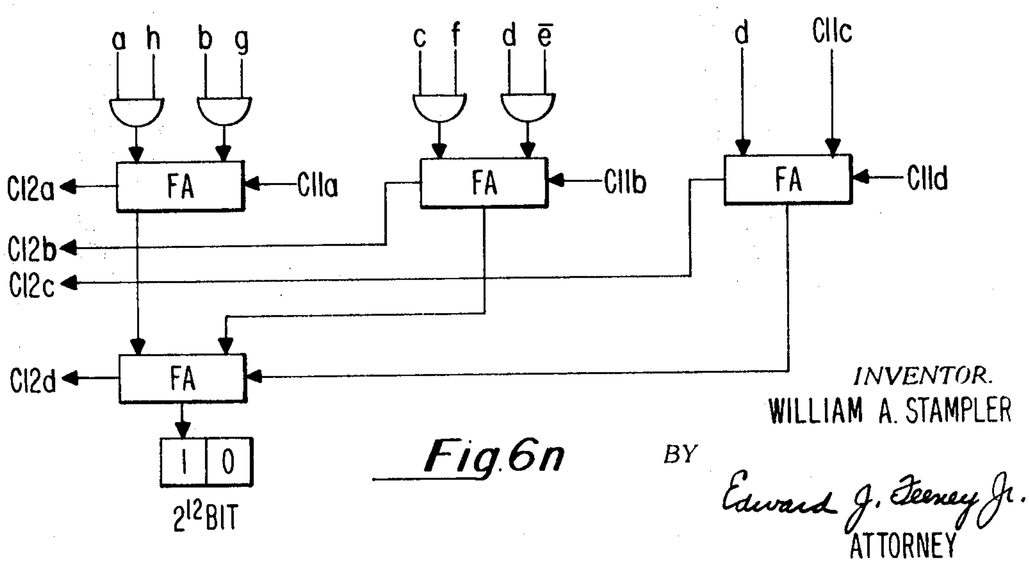
Figure 6O:
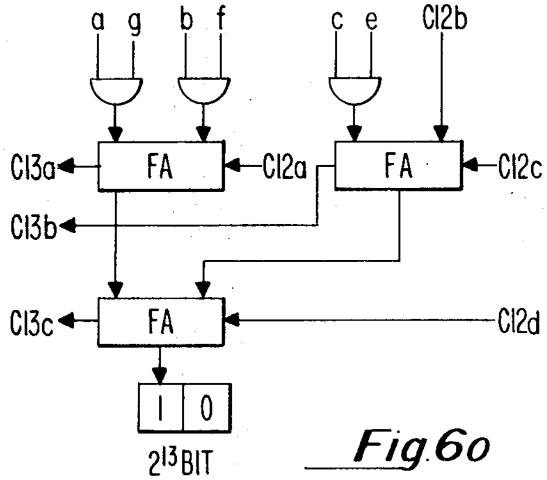
Figure 6P:
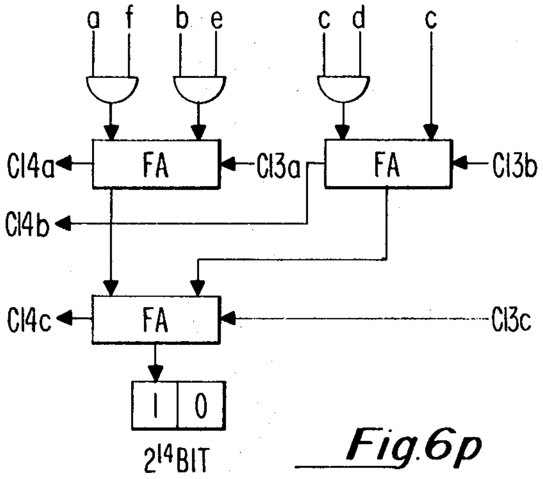
Figure 6Q:
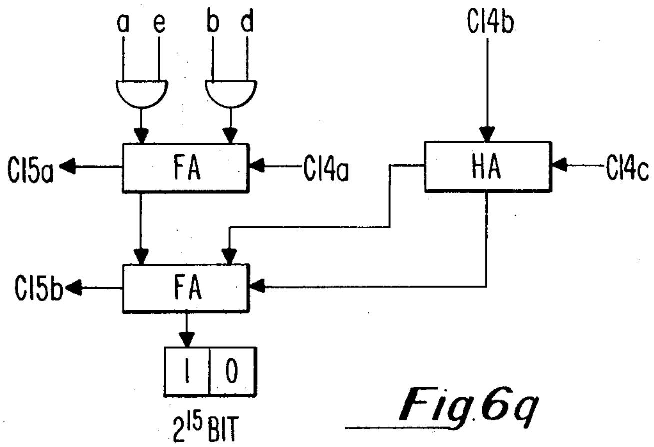
Figure 6R:
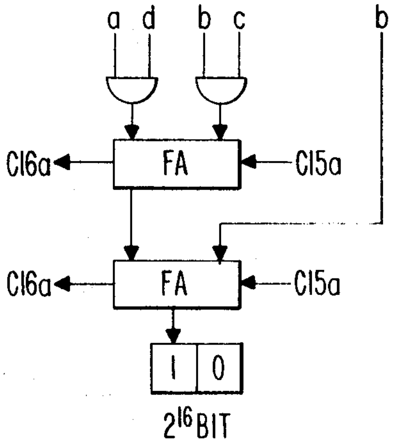
Figure 6S:
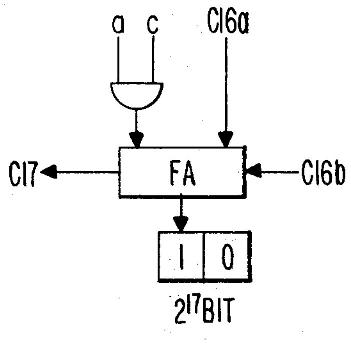

Bit $2^6$ (FIG. 6*h*)

This stage uses two full-adders to produce the sum for bit $2^6$ of the output register and to produce carries C6*a* and C6*b* for use by the $2^7$ stage.

Bits $2^7$ through $2^{17}$ (FIGS. 6*i* through 6*s*)

Logic for these stages is conventional. Multiple carries are generated and/or propagated as needed.

Figure 6T:
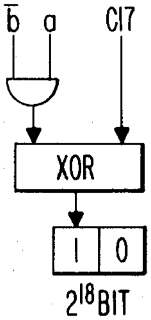

Bit $2^{18}$ (FIG. 6*t*)

The stage uses only a 2-input AND gate and an exclusive OR gate to produce the sum for bit $2^{18}$ of the output register. Note that no carry is generated for use by the $2^{19}$ stage.

Figure 6U:
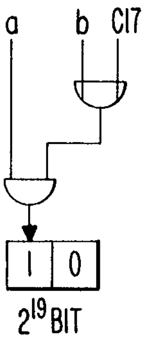

Bit $2^{19}$ (FIG. 6*u*)

This stage obtains its carry input direct from the $2^{17}$ stage (C17). This technique speeds up the carry propagation (bypassing the $2^{18}$ stage) without any significant increase in logical complexity.

Simplifying Carries

Figure 7A:
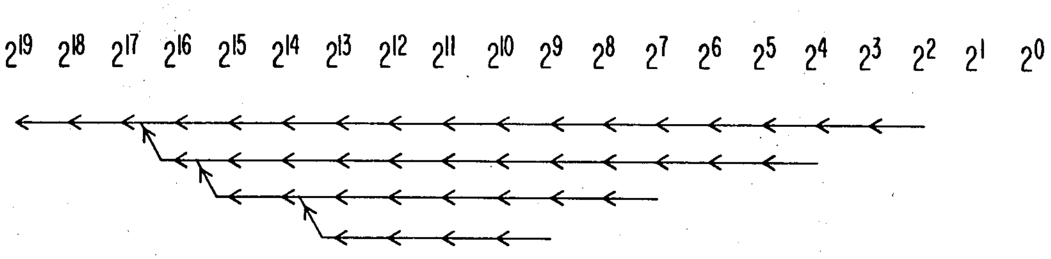
FIG. 7 includes FIGS. 7*a* and 7*b* and illustrates in FIG. 7*a* the conventional carry propagation for a 10-bit one-step adder.
FIG. 7*b* illustrates the shortening of the longest carry chain in the same 10-bit one-step adder.
Figure 7B:
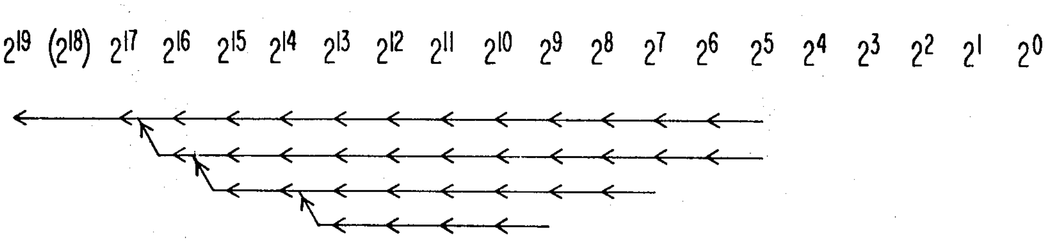

If conventional full-adders and carry generation were used from the $2^2$ stage to the $2^{19}$ stage, the carries would travel as shown by the horizontal lines in FIG. 7*a*. Note that up to 4 carries can exist simultaneously from the $2^9$ stage to the $2^{13}$ stage. Due to the techniques described for bits $2^{2,}$ $2^{3,\ 24,\ 218}$ and $2^{19}$ the carries in the suggested method of implementing the logic for the one-step adder shorten the chain of carries, as shown in FIG. 7*b*. The longest carry starts at the $2^5$ stage and ends at the $2^{19}$ stage, skipping the $2^{18}$ stage. Thus the carry propagation is speeded up at the cost of slightly more complex logic.

This description suggests ways of implementing the logic for the one-step adder. More advanced techniques may be used if desired. For increased speed, carry propagation could be speeded up still further at the cost of increased logical complexity.

It might be noted that propagation of several carries at once does not slow down carry propagation to any great extent; it is basically the path of the longest carry that is the limiting factor. Techniques for grouping the carries of two or more stages and propagating the resulting carry can be used if desired. However this and other techniques for carry propagation are not the basic subject of this application.

Simplifications for Single Precision Multiplication

The logic and discussions so far have concerned 10-bit operands and a 20-bit product such as would result from operating on integers. Such a 20-bit product is usually considered as a double-precision word because it has twice the number of bits as the basic data word. For most applications, single precision is sufficient, particularly in floating point operations. If the computer design favors single-precision operations the squaring logic can be simplified.

Thus in single-precision operations, the less significant half of the product would be ignored. However, the carries that would be produced in the logic for the less significant half of the product would have to be added into the least significant bit of the more significant half of the product. This is shown as bit $2^{10}$ of the drawings (61) of FIG. 6 and its carries C9*a*, C9*b*, C9*c* and C9*d*. In general the logic shown in FIGS. 6*a* through 6*f* can be eliminated for single-precision precision results. The logic shown in FIG. 6*g* would be retained. The logic for bits $2^6$ through $2^9$ (FIGS. 6*h* through 6*k*) would be retained but slightly simplified, as the "sum" outputs to the less significant half of the 20-bit output are not needed. If considered practical, techniques for producing carries directly without passing through adding logic of previous stages (as illustrated in FIG. 6*g*) can be used to provide carry inputs C9*a*, C9*b*, C9*c* and C9*d* for use by the $2^{10}$ stage. (Of course, the $2^{10}$ stage of FIG. 4 would provide the least significant bit of the single-precision product). If carries C9*a*, C9*b*, C9*c* and C9*d* are produced directly, all the logic shown in FIGS. 6*a* through 6*k* can be dispensed with. The multiplication speed would then be increased, as the carry chain would be shortened considerably.

Algorithms for Multiplying by the Difference of Two Squares Technique

Figure 8:
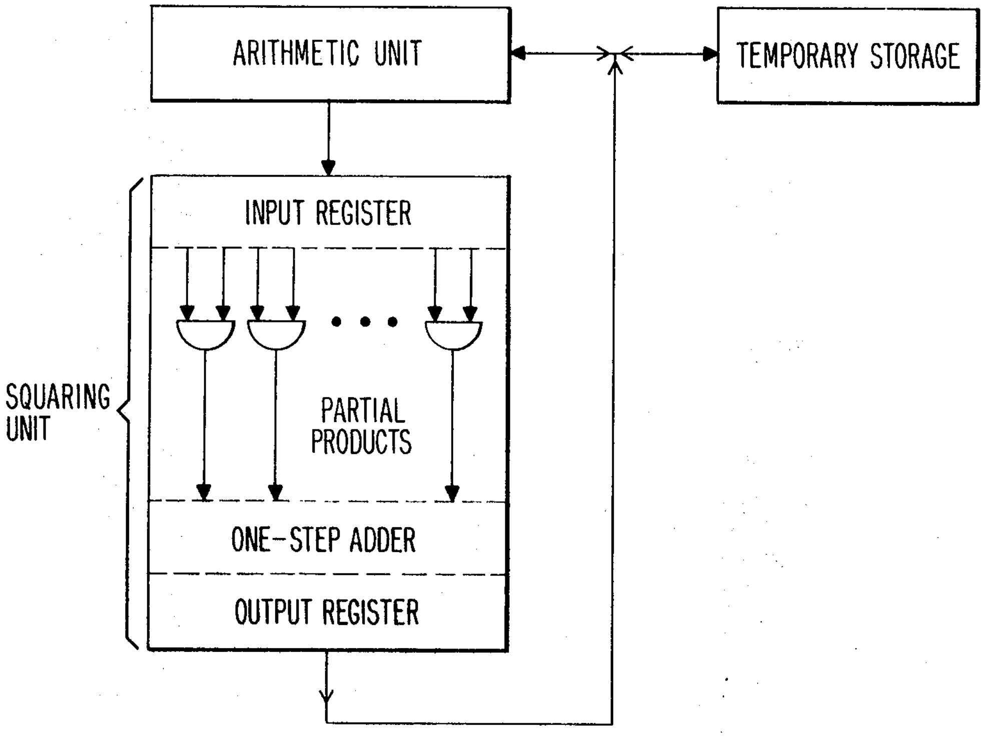
FIG. 8 illustrates a simplified diagram of a high-speed multiplier.

With the techniques for squaring an operand discussed in detail, the use of the squaring logic in combination with a computer's arithmetic unit will be described. A simplified diagram of the high-speed multiplier is shown in FIG. 8. The computer's conventional arithmetic unit operates independently of the squaring unit; in other words, once the arithmetic unit supplies a word to the input register of the squaring unit, the arithmetic unit is free to perform its normal functions of addition, subtraction, comparison, etc. This capability of independent operation is essential to high speed in the disclosed system of multiplication.

Three algorithms are given below. The first two yield high speed at the expense of requiring about twice as much hardware as the third (recommended) algorithm.

High-speed Algorithm

Figure 9:
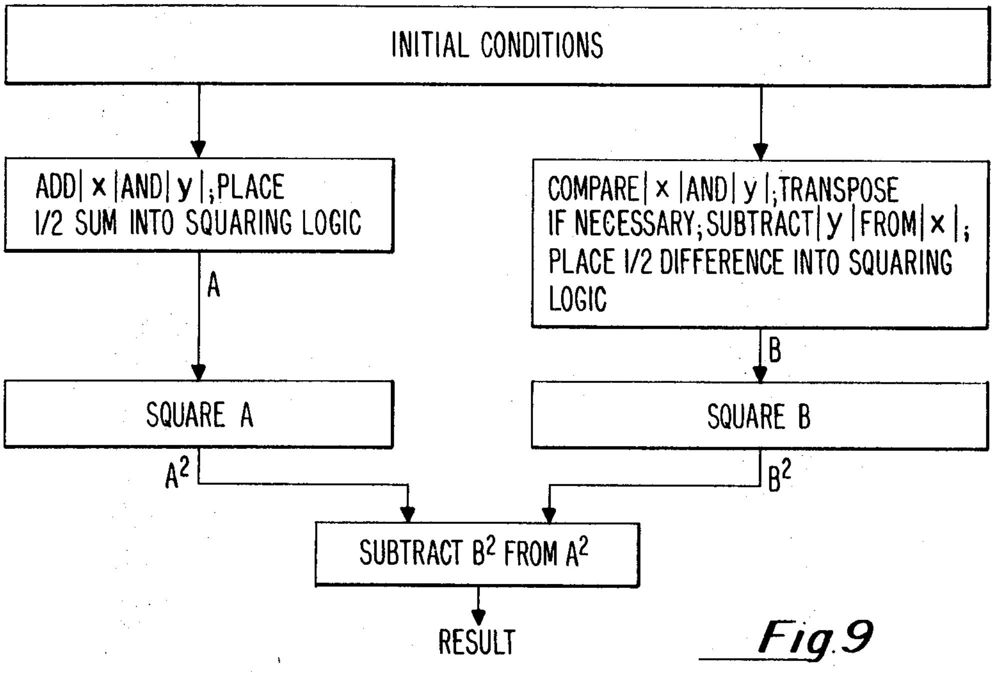
FIG. 9 shows a high-speed algorithm which corresponds to the simplified diagram of FIG. 8.

The algorithm shown in FIG. 9 corresponds to the simplified diagram of FIG. 8 except that two arithmetic units and two squaring units are needed for parallel operation.

Step 1. Initial Conditions

In this algorithm it is assumed that the two operands to be multiplied have been placed in both "conventional" arithmetic units. If floating point operation is used, the operands will be normalized to remove leading ZERO's. Since floating point operands have their exponent portion added together (to produce the exponent portion of the result), this portion of the multiplication will not be discussed as it is a separate and conventional process and can be completed long before the mantissa portions of the operands are processed. The following discussion therefore relates only to the mantissa portions of floating point operands (or the entire portion of integer operands).

In referring to the input operands $x$ and $y$, the squaring logic uses the absolute values $(|x|;|y|)$ regardless of the sign of the operand. Thus adding $x$ and $y$ is always a first operation as both are assumed to be positive and require no complementing operations within the conventional adder.

To take care of conditions where one input operand is an even number and one is an odd number, the squaring logic in this case requires an extra bit. For example, 10-bit operands would require 11-bit squaring units. Methods of compensating for this condition that do not require the extra bit are considered in the succeeding algorithms.

Step 2. Computing Squares of Sum and Difference

In this step, the addition of operands $x$ and $y$ is performed in one arithmetic unit and one-half the sum (designated at A in FIG. 9) is transferred to the squaring unit. As noted before the sum is effectively shifted right to perform a division by 2.

The output of the squaring unit $(x+y/2$is designated $A^2$ for convenience. This $A^2$ is transferred to the "minuend" portion of the previously used adder.

While the above has been occurring, operands $x$ and $y$ have been compared so that the smaller operand can be subtracted from the larger. If the comparison shows that a subtraction would give a negative result, the operands are transposed within the arithmetic unit.

With $x$ and $y$ in the proper registers of the arithmetic unit, $y$ is subtracted from $x$ and one-half the difference (designated as B) is transferred to the squaring unit input register. The output of this squaring unit is $(x-y/2)^2$ and is designated $B^2$. This $B^2$ is transferred to the subtrahend portion of the same adder that holds $A^2$.

Step 3. Subtracting $B^2$ from $A^2$

With both $A^2$ and $B^2$ transferred to one of the two arithmetic units, the subtraction process is performed, yielding the desired result.

Modified High-Speed Algorithm

Figure 10:
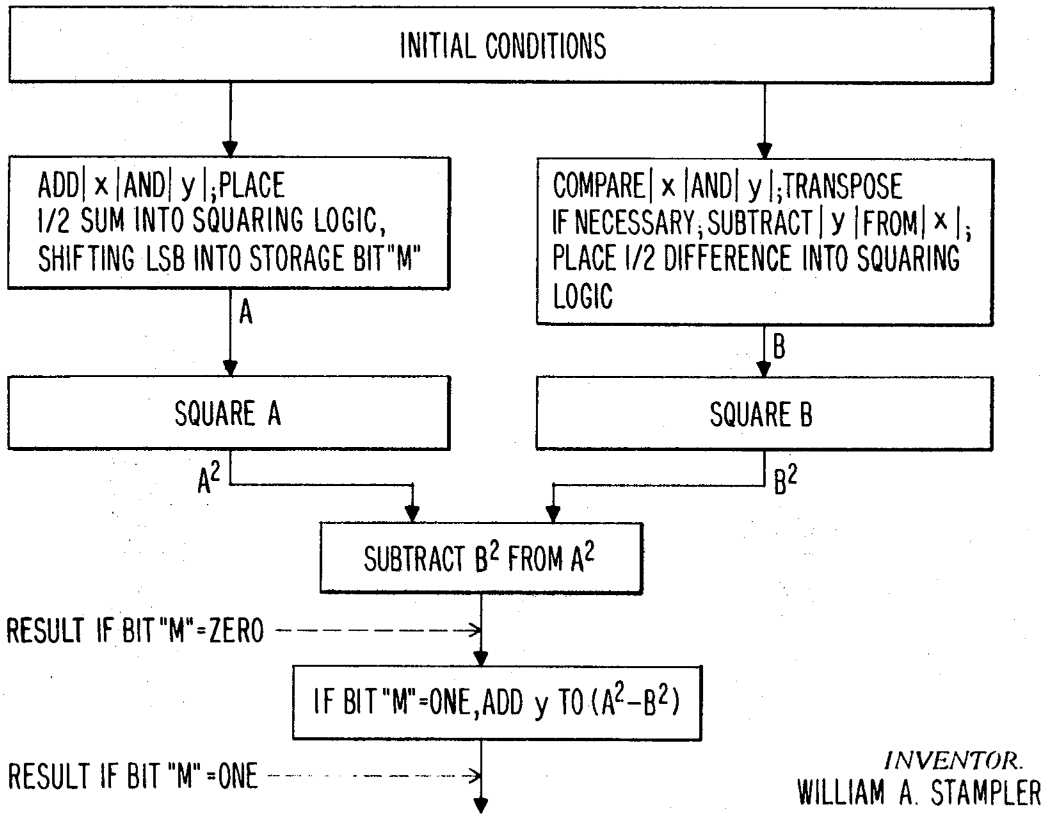
FIG. 10 is a modification of the high-speed algorithm.

This algorithm (shown in FIG. 10) requires provisions for one more addition, but does not require an extra bit to take care of multiplying an odd and an even number. Thus multiplying 10-bit operands requires 10-bit squaring.

Figure 11:
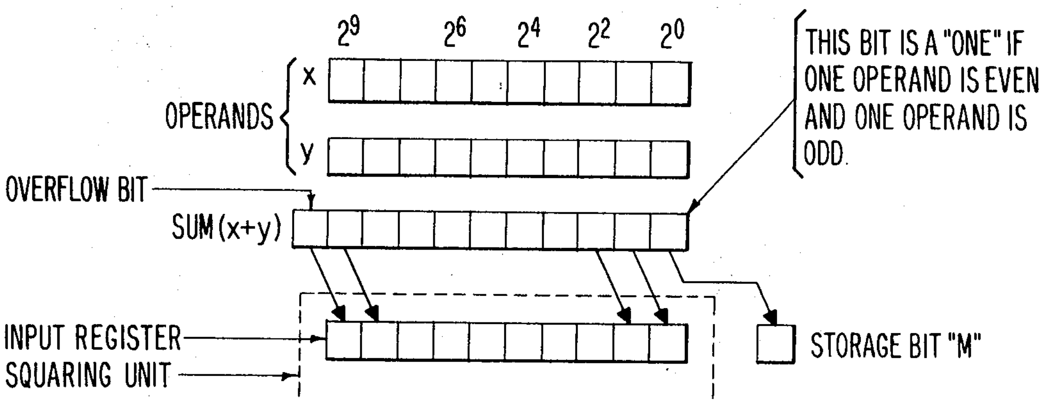
FIG. 11 illustrates the shifting operation at the input to the squaring unit.

In this algorithm, $x$ and $y$ are added as shown in FIG. 11. Note that in the "right shift" the least significant bit (1*sb*) of the sum is shifted into storage bit "M". Bit "M" will receive a ZERO if $x$ and $y$ are both even. However, if one operand is odd and one operand is even, bit "M" will receive a "ONE". This case involves special handling, as was previously indicated, where taking the average of an odd and an even number resulted in an answer with a fraction. (For example the average of 9 and 10 is 9.5). In the algorithm being discussed, the fraction (0.5) is ignored and compensated for later. The rationale behind this procedure is discussed as an addendum to this description.

In the initial subtraction process, $y$ is subtracted from $x$ as indicated previously. Operand "$y$" must always be the smaller operand. It is important that this distinction be made, for the smaller operand ($y$) is stored in a register temporarily if bit "M" is a ONE.

After the second subtraction process (in which $B^2$ is subtracted from $A^2$) bit M is tested. If it is ZERO, the desired result has been obtained. It is assumed that this second subtraction would be performed in the same arithmetic unit that is storing the previously computed exponent portion of the product. Thus the concluding of the subtraction process causes the entire product to be in one register. However, if bit "M" is a ONE, operand $y$, which was stored in a register for this purpose, is added to the result of the subtraction process ($y$ is added to $B^2-A^2$) to provide the desired result. This adding of $y$ to the difference of $A^2$ and $B^2$ compensates for ignoring the "fraction" in the right shift of the sum of $x$ and $y$.

Hardware Considerations

It is expected that the two high-speed algorithms previously discussed are not too practical at present because of the large amount of hardware involved. However, an algorithm using only one arithmetic unit and one squaring unit is considered practical if microcircuitry is used, although the component count may be high by present standards. For example, the number ($n$) of 2-input AND gates needed to produce the partial products may be found by:

$$n=b(b-1/2)$$

where $b$ is the number of bits in the operand. Thus a 10-bit squaring unit requires approximately 45 of the 2-input AND gates. This number varies if logical "short-cuts" are used such as shown in FIG. 6. A 35-bit squaring unit would require about 595 of the 2-input AND gates (for a double-precision 70-bit result). Therefore methods of minimizing hardware will be considered in the next algorithm.

Minimum Hardware Algorithm

Figure 12:
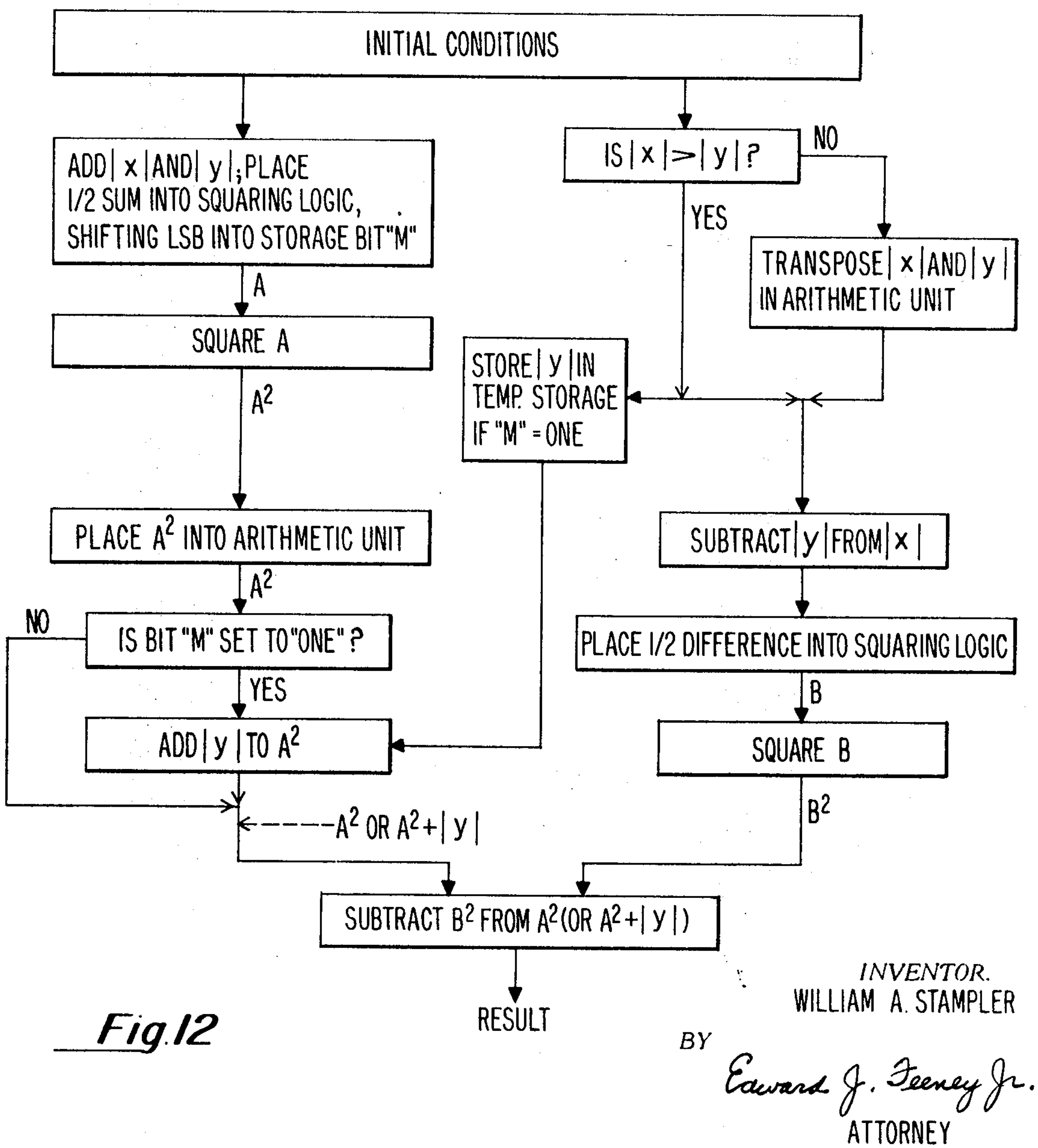
FIG. 12 is also an algorithmic diagram illustrating a minimum hardware configuration.

This method of multiplication time shares the squaring unit, as indicated in FIG. 12. The initial condition finds operands $|x|$ and $|y|$ in the conventional arithmetic unit.

Step 1. In this step, $x$ and $y$ are added and shifted into the squaring unit. The least significant bit of the sum is stored in storage bit "M". At the same time, a comparator or similar logic is comparing $x$ with $y$ to determine which is the smaller.

Step 2. The squaring unit squares A to produce $A^2$. Meanwhile $x$ and $y$ are transposed in the arithmetic unit if necessary to make $y$ the smaller operand. Then $y$ is subtracted from $x$ while $y$ is also placed in temporary storage if bit "M" is a ONE.

Step 3. The product $A^2$ is placed in the arithmetic unit while one-half the difference of $x$ and $y$ (B) is shifted into the squaring unit.

Step 4. The squaring unit squares input B to produce output $B^2$. Meanwhile if bit "M" is a ONE, $y$ is transferred from temporary storage to the arithmetic unit and added to $A^2$.

Step 5. As soon as $B^2$ is obtained from the squaring unit, it is transferred to the arithmetic unit and subtracted from $A^2$ (or subtracted from $A^2+y$ if bit M was a ONE). The difference is the desired result.

From FIG. 12 it is evident that the multiplication time is the sum of the following times:

Step 1—1 addition $(x+y)$

Step 2—1 squaring operation $(A\rightarrow A^2)$

Step 3—1 transfer operation

Step 4—1 squaring operation $(B\rightarrow B^2)$

Step 5—1 subtraction

If the computer performs subtraction by complementing the subtrahend and adding, the time required for the final subtraction $(A^2-B^2)$ can be shortened by eliminating the complementing and instead transferring the ZERO's from the product $B^2$ to the ONE inputs of the arithmetic unit. This action effects a complement action during the transfer of $B^2$.

At the end of the multiplying process, the adding of $y$ to $A^2$ is necessary in integer operations. In floating point operations where the least significant half of the double-precision product is usually dropped it might seem that adding in $y$ was not needed, as $y$ is added to the "discarded" portion of the product.

However, in some cases the final product in floating point operations will have a leading ZERO. For example:

Decimal $.5\times.5=.25$
Binary $.1\times.1=.01$
└Leading Zero

In this case the result will normally be shifted left one place and the exponent portion of the product adjusted accordingly. Thus bit $2^9$ of the double-precision product becomes the least significant bit of the normalized single-precision product. The most significant bit of $y$ should be added to the corresponding bit of the double-precision product before normalizing, to maintain precision if a left shift is necessary. Additional "roundoff" considerations are not considered here. However, the amount of hardware needed by the squaring unit can be reduced if single-precision is desired (rather than double-precision), even though part of the sum of $A^2$ and $y$ must be retained for precision.

Figure 13:
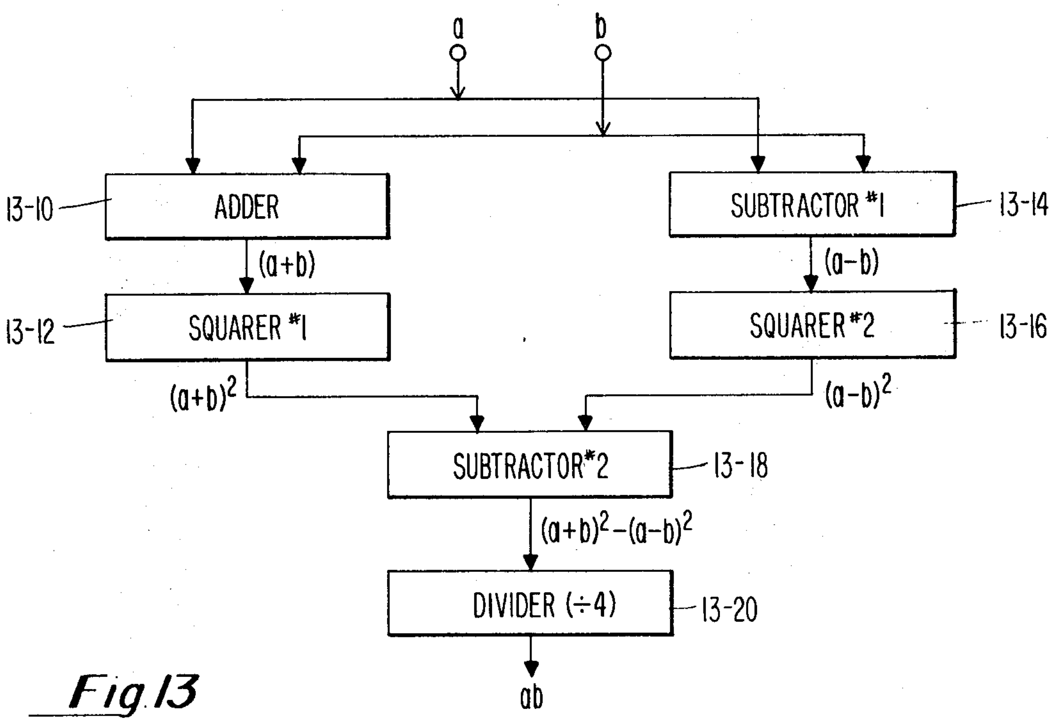
FIGS. 13 and 14 are block diagrams of suggested hardware configurations.
Figure 14:
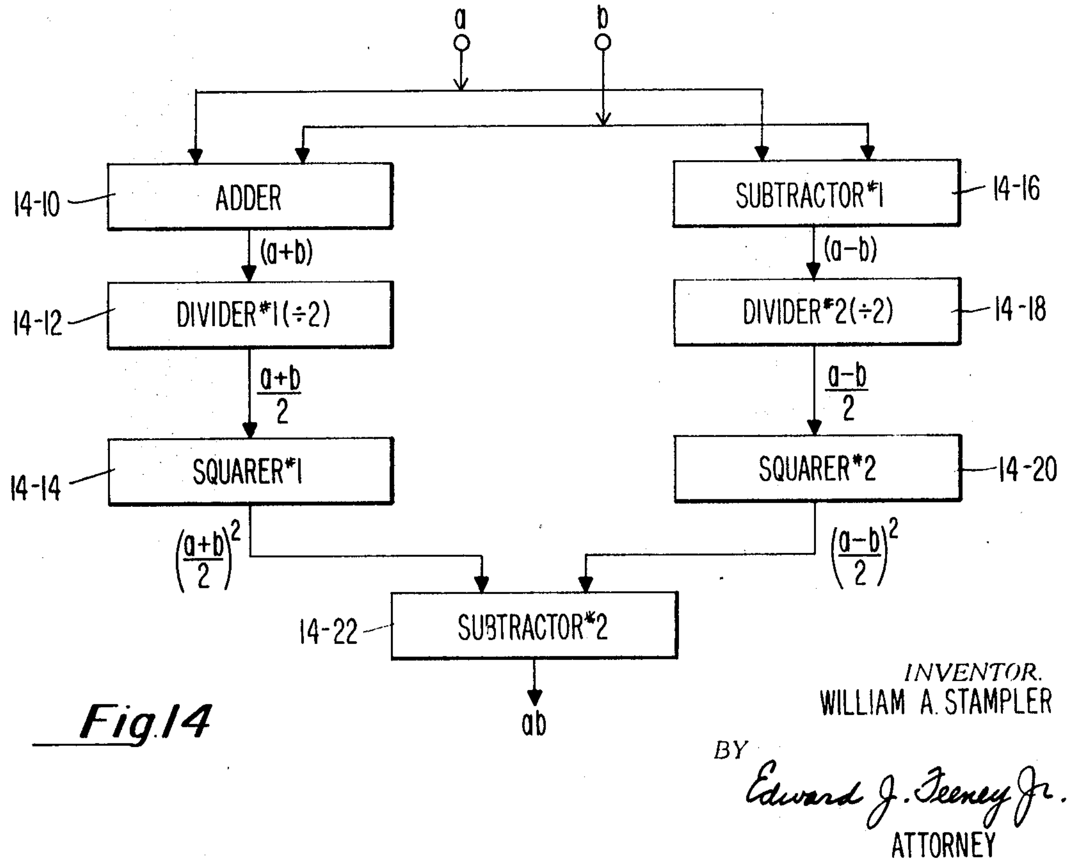

FIGS. 13 and 14 are included to show possible apparatus combinations that might be utilized to perform the suggested algorithms.

"Squaring" Operation for Increased Throughput

In addition to providing high-speed multiplication, the disclosed squaring unit can be used to implement a new "machine" instruction which might be called "square". This operation would be the opposite of the square root function. In integer operation, the program might call for squaring a word from memory or for squaring a word in the accumulator or in some other part of the arithmetic unit. This single word would be transferred directly to the squaring unit, which would produce the output as a one-step operation. There is no addition or subtraction required by the arithmetic unit in integer operations. The "square" operation is faster than any presently conceivable method for squaring an operand. To begin with, only one operand need be placed into the squaring unit, while conventional multipliers require bringing both operands separately even though they are identical, or they require duplicating the single operand before multiplying. Also the logic for squaring an operand as disclosed is simpler and faster than using logic capable of multiplying two different operands.

In floating point operations, the exponent portion of the operand would have to be doubled while the mantissa portion was being squared. This doubling can be effected by a simple left shift in the arithmetic unit, as suggested below:

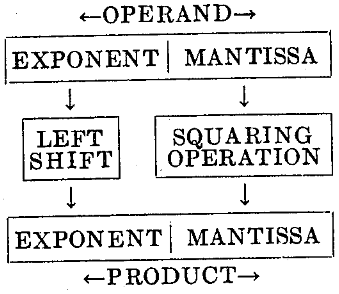

Thus the process of exponentiation can be extremely fast. Raising an operand to even powers ($x^2$, $x^4$, $x^6$, etc.) need only use the very fast squaring logic plus simple left shifts. Raising an operand to an odd power ($x^3$, $x^5$, $x^7$, etc.) would require one or more squaring operations followed by a single multiplication process.

Existing "customer" programs would not have to be modified to take advantage of the "square" instruction. The compiler could implement the square function from the program requirements instead of calling for multiplying two identical operands.

As previously discussed, the following material is included to illustrate the obtaining of the product of an odd number and an even number. To avoid using squaring logic for $n+1$ bits if the operands to be multiplied (one odd and one even) are $n$ bits each, a method must be incorporated to compensate for "dropping" a bit.

| Binary | | Decimal | |
|---|---|---|---|
| 1000<br>+0011 | | 8<br>+3 | |
| 10)1011 | | 2)11 | |
| 0101① <br>×0101 | Shift this bit into storage bit "M". | 5.⑤<br>×5 | (ignore) |
| 00011001 | | 25 | |
| 1000<br>−0011 | | 8<br>−3 | |
| 10)0101 | | 2)5 | |
| 0010①<br>×0010 | (ignore this bit). | 2.⑤<br>×2 | (ignore) |
| 00000100 | | 4 | |
| 00011001<br>−00000100 | | 25<br>−4 | |
| 00010101<br>+0011 | | 21<br>+3 | |
| 00011000 | ← Product → | 24 | |

$$\left[\left(\frac{x+y}{2}\right)-0.5\right]^2-\left[\left(\frac{x-y}{2}\right)-0.5\right]^2=Z$$

$$(.5x+.5y-.5)^2-(.5x-.5y-.5)^2=Z$$

$$xy-y=Z$$

As shown at the left of the preceding illustration the least significant bit ($lsb$) of one-half the sum of the operands is ignored, and the $lsb$ of one-half the difference is also ignored. Then after the difference of the two (truncated) squares is obtained, the value of the smaller of the two original operands is added to this difference to produce the full-precision result.

The right portion of the illustration shows how the fraction (0.5) was ignored in multiplying 8 by 3, and how adding the 3 to 21 produced the full result (24). The justification for this method of compensation for any operands ($x$ and $y$) is also illustrated. In this illustration the value of 0.5 is subtracted from one-half the sum of $x$ and $y$ and from one-half the difference of $x$ and $y$. After simplifying and solving the answer ($z$) is $xy-y$.

This shows that the answer is short of the desired product $xy$ by the amount $y$. Therefore adding $y$ will provide the correct result. In practice, $y$ can be added to the square of one-half the sum of the operands, and the final subtraction will give the desired result. This method is faster when the minimum hardware algorithm is used. In the example, the operations on the left would be replaced by the operation on the right.

$$\begin{array}{rl} 25 & \\ -\ 4 & \text{(final subtraction)} \\ \hline 21 & \\ +\ 3 & \\ \hline 24 & \end{array} \qquad \begin{array}{rl} 25 & \\ +\ 3 & \text{(compensation)} \\ \hline 28 & \\ -\ 4 & \\ \hline 24 & \end{array}$$

What has been shown is a suggested embodiment of a broad concept and it is readily realized that many modifications may be made to the version presented without departing from the spirit of this invention. It is therefore to be understood that the present invention is to be limited only by the bounds set forth in the following claims.

I claim:

1. A high-speed binary digital-multiplying device comprising an arithmetic unit connected to receive a first and a second operand to be multiplied, a squaring means connected to said arithmetic unit to receive therefrom a pair of identical operands to be multiplied and to provide thereto the squared value of the identical operands, said squaring means including an input register, a plurality of AND gates connected to said input register for producing a plurality of partial products, a one-step adding means connected to said plurality of gates to simultaneously add together said plurality of partial products, further means connected between said plurality of AND gates and said one-step adder for simplifying said partial products prior to said summation by said one-step adder, and an output register connected to said adder to receive and temporarily store the simultaneous summation of said partial products.

2. A high-speed binary digital-multiplying device for multiplying a first and a second operand comprising an arithmetic means and a squaring means connected thereto, said squaring means including means for producing partial products of said operands and further means connected to said partial product producing means for simplifying said partial products, said arithmetic means including means for supplying to said squaring means the sum of and the difference between said first and said second operands, said arithmetic unit including further means for receiving from said squaring means the squared values of said sum and difference and for subtracting the smaller of said squared values from the larger and for dividing the resulting difference by four and thereby provide the product of said first and second operands.

3. A high-speed binary digital-multiplying device as set forth in claim 2 wherein said squaring means further includes an input register to receive the sum and difference of said first and second operands, said means for producing partial products comprising a plurality of AND gates connected to said input register for producing partial products, a one-step adder commonly connected to said simplifying means to simultaneously add together said simplified partial products and an output register connected to said one-step adder to receive and temporarily store the desired product so produced.

4. A high-speed binary digital-multiplying device for producing the product of a pair of identical operands, comprising an input register, a plurality of gates connected to said input register to produce a plurality of partial products, a one-step adder commonly connected to said plurality of gates to simultaneously add together said plurality of partial products, a means connected between said plurality of gates and said one-step adder to simplify said plurality of partial products prior to their simultaneous addition by said adder, and an output register connected to said one-step adder to store the squared product of said pair of identical operands.

5. A high-speed binary digital-multiplying device comprising an arithmetic unit capable of receiving a first and a second operand, a logical squaring means connected to said arithmetic unit to provide a one-step squaring operation, said squaring means further including a means for producing, simplifying and adding a plurality of partial products, a one-word temporary storage means also connected to said arithmetic unit, and a separate subtraction unit connected to said squaring means and to said temporary storage means to provide therefrom the product of said first and said second operands.